United States Patent

[11] 3,572,537

[72] Inventor Charles N. Baltzer
1360 Custer St., Cincinnati, Ohio 45208
[21] Appl. No. 789,147
[22] Filed Jan. 6, 1969
[45] Patented Mar. 30, 1971

[54] MULTIPLE BAKE PAN SET CONSTRUCTION
24 Claims, 10 Drawing Figs.
[52] U.S. Cl. ................................................ 220/23.4,
220/80
[51] Int. Cl. ............................................... B65d 21/02
[50] Field of Search .......................................... 220/23.2,
23.4, 80, 6 (T) (D)

[56] References Cited
UNITED STATES PATENTS
1,470,273  10/1923  Debs ........................... 220/23.4
1,521,289  12/1924  Gattman ....................... 220/23.4
1,553,617  9/1925   Katzinger ..................... 220/23.2UX
1,730,919  10/1929  Debs ........................... 220/23.2
2,695,207  12/1954  Windsor ....................... 220/80X
3,406,860  10/1968  Kaufman ....................... 220/23.4

Primary Examiner—George E. Lowrance
Attorney—J. Warren Kinney, Jr.

ABSTRACT: The multiple bake pan set or unit utilizes a rectangular frame of rigid strapping, in which the pans are arranged more or less loosely until a binding harness is applied for clamping the pan rims between rigid elements of the harness and frame. Wire reinforcing for the pan rims is eliminated, and pan replacements are effected on the job with ease and despatch, by removing the harness. Cooperative pan support areas on the frame and harness protect the pans, and especially their upper peripheral portions, from damage in use.

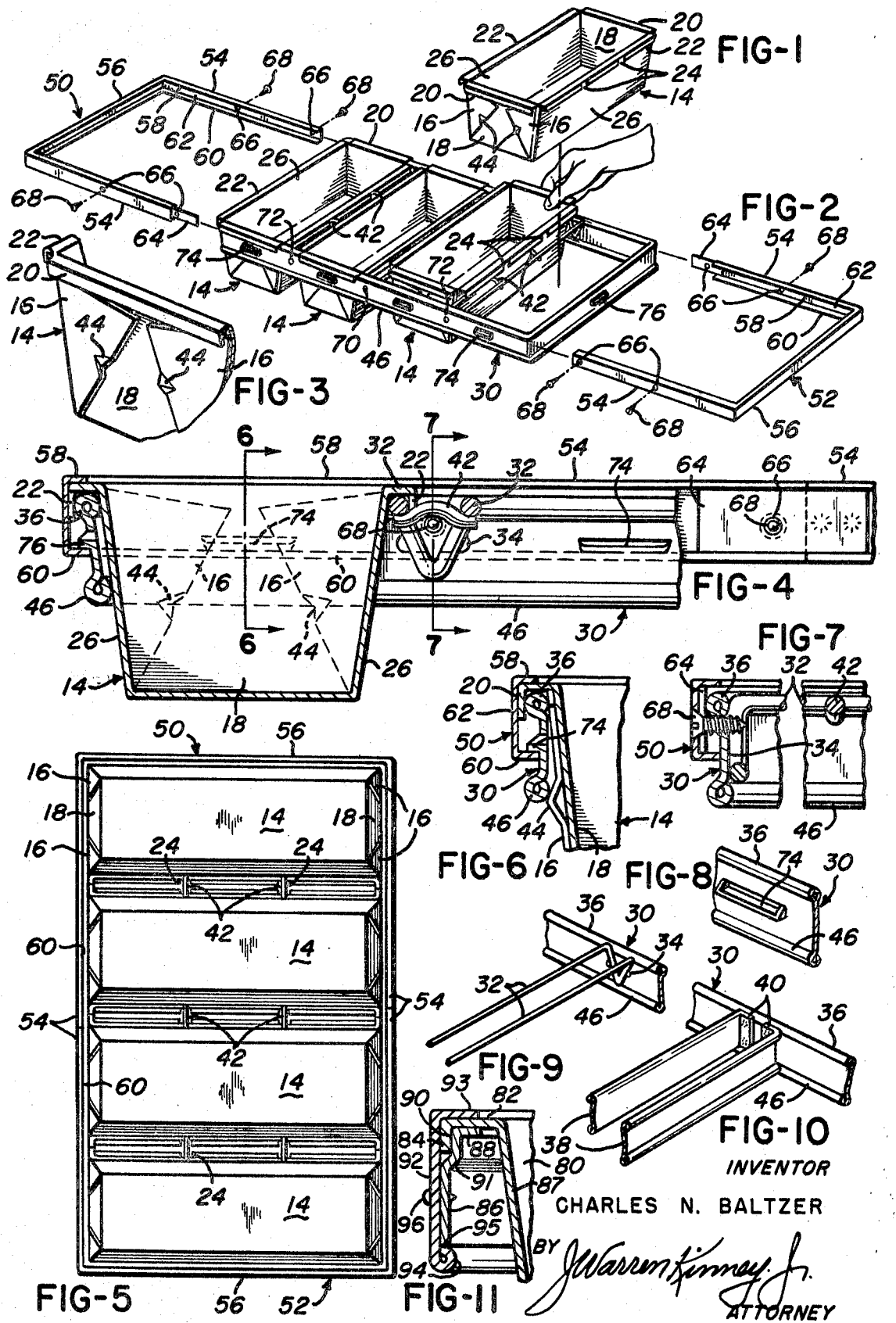

MULTIPLE BAKE PAN SET CONSTRUCTION

This invention relates to a multiple bake pan set, such as may be used in the commercial production of bread loaves and similar baked products. The pan set comprises a plurality of pans, a supporting frame therefor, and a readily detachable harness for releasably securing the pans within the frame until pan replacement becomes necessary or desirable, when by means of a quick and simple procedure the pans may be released, replaced, and resecured to the supporting frame.

An object of the invention is to provide in a multiple bake pan set, a simple, inexpensive, and commercially practical means for quick and easy replacement or substitution of pans in the set.

Another object of the invention is to provide a multiple bake pan set having the advantages stated, in which the commonly acceptable basic design is retained in order to accommodate current practices and procedures with respect to manufacture and usage, including the incorporation of nesting lugs, bumpers, and other accessory features sometimes considered desirable by the industry.

Another object of the invention is to minimize the cost of parts and simplify the assembly of multiple pan sets, with resultant economic savings in maintenance costs as well as in initial production of the pan sets.

A further object of the invention is to obviate the expensive practice of incorporating heavy wire reinforcing in the rims of bake pans used in multiple pan sets.

Another object of the invention is to provide a multiple pan set wherein the pan spacing means may be permanently mounted upon the pan set frame, to furnish sturdy and effective support for the unreinforced rims of the pans.

A further object of the invention is to provide an assembly of pans so constituted that damaged pans may easily and quickly be replaced at the bakery, and without sending the pan sets to a factory or repair shop.

The foregoing and other objects are attained by the means described herein and illustrated upon the accompanying drawing, in which:

FIG. 1 is a perspective view of a folded-metal bake pan, a constituent of the multiple pan set of the invention.

FIG. 2 is an exploded perspective view of the multiple pan set of the present invention.

FIG. 3 is a fragmentary perspective of a pan end, showing the metal folds thereof treated in accordance with the present invention.

FIG. 4 is a fragmentary enlarged longitudinal cross section of the pan set, showing one pan in place upon the pan frame.

FIG. 5 is a bottom view of the completely assembled pan set.

FIG. 6 is a fragmental cross-sectional view taken on line 6—6 of FIG. 4.

FIG. 7 is a fragmental cross-sectional view taken on line 7—7 of FIG. 4.

FIG. 8 is a fragmental detail view of a portion of the surrounding frame or band of the pan set.

FIGS. 9 and 10 are fragmental perspective views of alternative forms of pan spacers that may be employed in producing the pan set.

FIG. 11 is a view similar to FIG. 6, showing a modification.

Common practice has been to incorporate two or more bake pans in a unit or set, with a surrounding frame or strapping serving to connect the pans and thereby permit efficient handling in the baking process. The pans of a set are often constructed of folded or drawn sheet metal, and sometimes of molded plastic, and are therefore subject to damage by denting, bending, and breakage, due to mistreatment in handling. Conventional pan sets which are severely bent or misshapen must eventually be discarded, as they lose their usefulness and cannot ordinarily be economically restored to useful condition. In most instances, however, the frame or strapping outlives the pans due to its heavy construction, so that discarding of the frame or strapping constitutes a considerable waste.

One of the objects of the present invention is to so construct a multiple pan set that its original frame may quickly and easily be equipped with new pans to replace damaged ones whenever necessary, the replacement being so simplified that it may be effected with the use of simple tools, on the job, and without the use of skilled labor.

Referring now to the drawing, FIG. 1 illustrates a single bake pan 14 which is formed from an initially flat blank of thin sheet metal, folded at 16, 16 to produce the end walls of the pan. The folds at 16, 16 are formed outside of the pan to overlie the end walls 18, 18 and each fold consists of two thicknesses of metal in addition to the end wall thickness.

The open top of each pan is defined by a plurality of outwardly then downwardly turned rim flanges, those of the end walls being denoted 20, 20, and those of the sidewalls being denoted 22, 22. The sidewall rim flanges 22, 22 may or may not be continuous along the length thereof, although as shown herein by way of example, said flanges are cut a0ay or notched at 24, for a reason to be explained later.

It is noteworthy that the rim flanges 20, 20 22, 22 are not wire-reinforced to rigidify the open top of the pan, but instead, the rim flanges are merely turned outwardly then downwardly in spaced relationship to the side and end walls of the pan. All the rim flanges are of single-thickness metal, and will preferably reach the corners of the pan top. The pan sidewalls are denoted 26, 26 and each carries a rim flange 22 just as each end wall carries a rim flange 20. The side and end walls are flared outwardly in the upward direction.

Folded metal pans are common in the art, but are usually wire-reinforced at the top flanges.

If four pans are to constitute a set, as is usual, the four pans will preferably be identical, and constructed according to FIG. 1. The pans of the set are to be supported within a rectangular frame 30 formed preferably of heavy gauge steel strapping beaded along the upper and lower parallel edges thereof for strength and rigidity.

The width of frame 30, according to FIG. 2, approximates the length of a pan as measured from end wall to end wall near the top thereof. The length of the frame exceeds substantially the combined width dimensions of the pans accommodated by the frame, so that the pans may be supported in spaced parallelism within the confines of the frame, to permit upward circulation of oven heat between adjacent pans.

For supporting the pans in spaced relationship, the frame may be provided with any suitable type of cross brace or strut, two forms of which are shown in FIGS. 9 and 10 by way of example. According to FIG. 9, the strut comprises a pair of spaced parallel wires 32, 32, having their opposite ends at 34 welded or otherwise secured to the opposite side rails of the frame. As FIG. 4 plainly indicates, the wires 32 are properly located to enter and support the downturned rims 22 at the sides of the pans. In the case of the endmost pan of a set (FIG. 4), one side rim rests upon a wire 32 while the opposite side rim rests upon the upper reinforcing bead 36 of frame 30. The side rims of the intermediate pans of a set will rest upon the wires of adjacent struts.

An alternative form of strut or crossbar structure, FIG. 10, may comprise a pair of spaced parallel metallic straps 38, 38, having ends welded at 40 to the opposite side rails of frame 30. The upper edges of straps 38, 38 provide the required support for the side rims of adjacent pans, just as do the wires 32, 32 of FIG. 9. It is to be noted that the pan rims are not wrapped or closed about the supports 32, 32 or 38, 38. Preferably, though not necessarily, the support wires 32, 32 of a strut are held rigid relatively, as by means of transverse connecting wires 42 welded to the support wires. The notches 24 of the pan side rims accommodate the transverse connecting wires 42, thereby to ensure proper seating of the pans upon the supports 32. In the absence of reinforcing members such as 42, the pan rim notches 24 may be eliminated, if desired.

The pans are insertable into frame 30 from above, as suggested by FIGS. 1 and 2, and when in home position the pan rims will rest upon the upper edges of the frame and upon the transverse crossbars. To temporarily prevent downward displacement of the frame after insertion of the pans, the pan ends may be provided with resilient lugs or detents 44 that project from the pan ends a distance such as to frictionally engage the frame when the pans are fully inserted; or if desired, the lugs or detents 44 may yieldingly latch beneath the lower edge or bead 46 of the frame, (FIG. 6) thereby to yieldingly resist upward displacement of the pans from the frame, or relative lowering of the frame while the pan bottoms rest upon a flat surface.

The lugs or detents 44 may be simply produced by outwardly distending the metal of the folds 16, 16, so that insertion of the pan into the frame will be yieldingly resisted by the detents engaging the frame as the pan is forced to home position, FIG. 4. Said yielding resistance, however, will not prevent displacement of a pan for purposes of replacement or substitution, when force is applied deliberately to dislodge a pan or pans from the frame.

In the light of the foregoing explanation, it will be understood that during assembly of the unit, the pans may be inserted into a frame according to FIG. 2, with lugs or detents 44 serving to preclude dropping of the frame in the event that the pan bottoms rest upon a supporting surface. Such functioning of the lugs or detents is to be regarded as a temporary function useful during assembly of the unit, since a much stronger and more positive means is provided for locking the pans to the frame incident to final assembly, as will be explained.

The means for securely locking the pans to the frame comprises a harness, which harness is applicable and removable with the use of a simple tool, or screwdriver. The harness is so constructed that it may easily and quickly be demounted from the pan set, to release the pans thereof for replacement with new or different pans when necessary. The replacement may easily be accomplished on the job, without the use of skilled labor, or tools other than a common screwdriver.

With reference to FIG. 2, the numerals 50 and 52 indicate two identical slide members, each formed of channel iron stock bent to U-shape so as to provide spaced parallel arms 54 joined by a connecting portion 56. Each channel iron has an upper leg or flange 58, a lower leg or flange 60, and a connecting web 62 characterizing the parts 54, 54, 56. One arm 54 of each slide member may carry a welded extended tongue 64 having formed therein a perforation 66. The arms may be provided with other perforations 66, to receive screws or other fasteners 68.

Slide member 50 is dimensioned for advancement slidably lengthwise of pan frame 30, with the upper legs 58 of arms 54, 54 overlying the rim flanges 20 of two pans. Similarly, slide member 52 is advanceable along the frame, toward member 50, with its upper channel legs 58 overlying the rim flanges 20 of the remaining two pans embraced by the frame. Full advancement of the slide members places the tongue 64 of one within the channel of the other slide member, with registry of holes permitting insertion of fasteners 68 to secure the slide members to one another at their free ends. The same fasteners enter holes 70 formed in the opposed side members of frame 30. Additional fasteners may pass through the slide member arms 54, and anchor themselves in holes 72 formed in the opposite side members of frame 30.

The lower legs 60 of the arms 54 of each slide member, are adapted to engage outward projections 74 (FIG. 6), formed on the sides of frame 30. Projections 74 engage the lower channel legs 60 to exert a downward wedging force thereon, with the result that the upper channel legs 58 bear forcefully upon the rims 20 of the pans, to securely anchor the pans onto the upper beaded edges 36 of the frame. Projections 74 may be in the form of inclined lugs or ears punched from the metal of frame 30, the inclination being upwardly and outwardly of the pan set. The number of projections 74 employed is not critical, but one may be provided near each end of each pan.

Projections 76 similar to the projections 74, may be provided on the opposite end members of frame 30, (FIG. 4), for the purpose of depressing downwardly the channel leg 60 and causing the upper leg 58 to press the pan rim 22 firmly onto the upper bead 36 of the frame. One or more projections 76 may be employed, as desired.

The projections 74 and 76 cooperate to pull down all the rims of the several pans comprising the set, including those pan rims which overlie the cross bars 32, 32 or 38, 38. As will be understood, the rims of the pans will be tightly secured so long as the U-shaped slide members 50 and 52 embrace the pan frame 30. By outwardly withdrawing the slide members 50 and 52 as suggested by FIG. 2, all the pans are released at their rims, and one or more may easily be dislodged from the frame for replacement with new or different pans. The only tool required is a screwdriver for manipulating the screws or fasteners 68.

Earlier herein, it was mentioned that bake pans are sometimes fabricated of molded plastic. Molded plastic pans may be formed as individuals, or as a multiple pan set in which two or more are molded as an integral unit. Such pans also may be fabricated of drawn metal, either as individuals or in a set of two or more. Drawn metal pans are usually formed as individuals.

In the case of individual pans, whether drawn or molded, each pan 80 (FIG. 11) will usually include a peripheral outwardly directed rim 82 from which depends a rim flange 84 spaced from a pan wall 87. The rim 82 may be continuous in defining the open top of the pan, and the downturned flange 84 will of course be integral with the rim. Such pans are sometimes referred to as seamless pans.

Pans such as 80 may be assembled into a multiple pan unit as follows. At 86 is shown a length of steel strapping which is bent to form a rectangular frame quite similar to the frame 30 of FIG. 2, having side rails and end rails forming rectangular corners, and adapted to encircle a group of pans, one of which is denoted 80, in FIG. 11. The side and end rails of rectangular frame 86 have formed thereon inwardly turned horizontal flanges such as 88, to underlie and support the pan rim portions 82. Adjacent to the flange 88, each side and end rail of frame 86 is provided with an upright seating area 90 offset inwardly at 91 by an amount approximating the thickness of pan flange 84, and against this seating area 90 the pan flange 84 rests in flatwise abutment.

The pan rim portion 82 and its flange 84 are adapted to be securely clamped against frame areas 88 and 90, by a harness similar to that at 50, 52 of FIG. 2. FIG. 11 shows only one of the harness parts, or slide members, denoted 92; however, it must be understood that two such parts or members are employed, as in FIG. 2. Each slide member such as 92 is formed of tough steel strap material bent to U-shape as in FIG. 2. The cross section of member 92 may be of channel shape, or substantially so according to FIG. 11 wherein the upper edge portion is turned inwardly to provide a flange 93, and the lower edge portion is turned to provide a roll 94 which, in effect, is a lower flange adapted to engage an abutment or edge 95 of frame 86.

In assembling a pan set according to FIG. 11, the pans are first placed within the rectangular frame 86 according to FIG. 2. Thus, as to FIG. 11, the pan parts 82 and 84 will be abutting the frame parts 88 and 90. Then, the U-shaped harness members or slide members 92 will, in the manner of FIG. 2, be slid into place with the lower flange 94 forcefully contacting the edge or abutment 95, while the upper portion including flange 93 forcefully embraces and clamps the pan rim 82 and flange 84 against frame areas 88 and 90. The slide members of the harness may be fixed against separation one from the other, in any suitable manner. By way of example, screws, rivets or other fasteners 96 may be employed for the purpose. The fasteners 96 may or may not anchor in the material of the inner frame 86, and any desired number of such fasteners may be provided as required.

It will be understood from the foregoing, that the fasteners 96, or some of them, may be readily removable to permit disassembly of the pan unit for the benefit of pan replacement, if desired.

In the FIG. 11 construction, as well as in those of FIGS. 1 through 10, the steel banding used in the encircling frame and harness of the unit, is seen to be spaced from the adjacent wall of the pan. This provides an air space which precludes heat conduction from the banding to the pan wall while in the baking oven, thereby preventing the formation of hot spots in the pan walls which might undesirably overbake and mark some portions of the baked product.

The banding and harness members are formed of tough steel, and are so related to the pan rims and flanges as to protect said rims and flanges from damage in use and handling of the pan units. The pan units often are subjected to impacts of considerable force, for example when inverted and bounced against a hard surface in dislodging the contents of the pans. Also, stacking of the units often subjects them to considerable abuse, the force of which will be assumed by the steel strapping in protecting the pan rims and flanges.

It is noted that pan units constructed in accordance with the present invention require no welding of parts in the manufacture, and the construction desirably eliminates the need for reinforcing wires in the pan rims. The invention is applicable to all forms of pans, whether drawn, molded, or of folded sheet materials, either plastic or metallic. Furthermore, it is immaterial to the present invention whether the pans employed in forming a set or unit are individual pans, or pans in multiple formed from a single sheet of metal, or produced in a mold presenting two or more pans integrally formed. In any case, the pans or pan group of a unit should include rim portions and flanges such as 82 and 84 of FIG. 11, or as depicted by FIG. 3 at 22 and 20, these parts to be supported and protected by the strapping frame and harness members.

It is pointed out further, that adjacent pans of a unit need not necessarily be separated by an air space as shown in the drawing FIGS. nor is it necessary always to provide supports between adjacent pans as suggested by FIGS. 9, 10, and 4. In the absence of such supporting spacers, the rims or flanges of adjacent pans in a unit may be joined together by mechanical means, or welds if desired. In the case of multiple pans molded or drawn as a one-piece construction, the space between adjacent pans may be spanned by webs of material integral with the pan sides, and such webs may be either perforate or imperforate.

Great economies may be effected with the use of multiple pan sets as herein disclosed, since damaged pans may easily be replaced with new ones. The replacement pans are much less expensive than pans with wire-reinforced rims, and they may be less expensively shipped and stored due to their superior nesting advantages. Also, it is noteworthy that pan sets or units as herein disclosed require no changes in customary handling or use procedures, and accordingly, the equipment currently in use for baking in multiple pan sets operates as effectively with the improved pan units as it does with the older type units.

The improved pan sets or units of this invention lend themselves readily to the incorporation of various refinements, such as the addition of bumpers, nesting lugs, and other accessory features sometimes considered desirable by users. Other advantages of the invention have been mentioned earlier herein.

I claim:

1. In a multiple bake pan set, the combination which comprises: a plurality of elongate bake pans each having a bottom, opposed sidewalls, opposed end walls, and an open top; a rim flange on each sidewall and on each end wall defining the open top of the pan, said rim flanges extending outwardly from said side and end walls; a rectangular rigid frame surrounding the pans and readily removable therefrom, said frame having spaced parallel side members and spaced parallel end members, each of said side members having an upper edge underlying the rim flanges of the pan end walls; means on said frame supporting the rim flanges of the pan sidewalls; and a harness removably mountable upon said frame, said harness extending substantially the length of said frame and including clamping means extending substantially the length of the harness for clamping the rim flanges of the pan end walls into firm engagement with the underlying upper edges of the frame side members.

2. The combination as specified by claim 1, wherein the combination includes means for temporarily and displaceably maintaining a frame-supportive connection between the pans and the frame, following removal of the harness from said frame.

3. The combination as specified by claim 2, wherein the aforesaid means on said frame supporting the rim flanges of the pan sidewalls, performs to space from one another the rim flanges of the sidewalls of adjacent pans in the set.

4. The combination as specified by claim 1, wherein the side members of the rigid frame and the end walls of all the pans, include cooperative yielding means to maintain an elevated condition of the frame relative to the pan bottoms as said pan bottoms rest upon a supporting surface in the absence of said harness.

5. The combination as specified by claim 4, wherein the end walls of the pans are formed of folded sheet metal, and said cooperative yielding means includes an outwardly projected detent formed on a fold of each pan end wall.

6. In a multiple bake pan set, the combination which comprises: a plurality of elongate bake pans each having a bottom, opposed sidewalls, opposed end walls, and an open top; a rim flange on each sidewall and on each end wall defining the open top of the pan, said rim flanges extending outwardly from said side and end walls; a rectangular rigid frame surrounding the pans and having spaced parallel side members and spaced parallel end members, each of said side members having an upper edge underlying the rim flanges of the pan end walls; means on said frame supporting the rim flanges of the pan sidewalls; a harness mountable upon said frame, said harness including means for clamping the rim flanges of the pan end walls into firm engagement with the underlying upper edges of the frame side members; the side members of the rigid frame and the end walls of all the pans, including cooperative yielding means to maintain an elevated condition of the frame relative to the pan bottoms as said pan bottoms rest upon a supporting surface in the absence of said harness; said end walls of the pans being formed of folded sheet metal, and said cooperative yielding means including an outwardly projected detent formed on a fold of each pan end wall; said harness including a pair of U-shaped slide members having each a pair of spaced parallel arms to embrace the side members of the frame; and said clamping means including an upper longitudinal flange on each of said arms to overlie the rim flanges of the pan end walls, and cooperative means on said arms and said frame side members, to depress the flanges of said slide member arms forcefully upon the rim flanges of the pan end walls.

7. In a multiple bake pan set, the combination which comprises: a plurality of elongate bake pans each having a bottom, opposed sidewalls, opposed end walls, and an open top; a rim flange on each sidewall and on each end wall defining the open top of the pan, said rim flanges extending outwardly from said side and end walls; a rectangular rigid frame surrounding the pans and having spaced parallel side members and spaced parallel end members, each of said side members having an upper edge underlying the rim flanges of the pan end walls; means on said frame supporting the rim flanges of the pan sidewalls; a harness mountable upon said frame, said harness including means for clamping the rim flanges of the pan end walls into firm engagement with the underlying upper edges of the frame side members; said harness comprising a pair of displaceable U-shaped slide members having each a pair of spaced parallel arms to embrace the side members of the frame; and said clamping means including an upper longitudinal flange on each of said arms to overlie the rim flanges of the pan end walls.

8. The combination as specified by claim 7 wherein said clamping means is carried by the frame side members and the arms of said U-shaped slide members.

9. The combination as specified by claim 8, wherein is included means for releasably securing the slide members to one another.

10. The combination as specified by claim 8, wherein is included means for releasably securing the slide members to the rigid frame.

11. The combination as specified by claim 1, wherein is included means for releasably securing the harness against displacement from the rigid frame.

12. The combination as specified by claim 3, wherein the end walls of the pans are formed of folded sheet metal, the folds of which in cooperation with the rigid frame, carry the aforesaid means for temporarily and displaceably maintaining a frame-supportive connection between the pans and said frame.

13. In a multiple bake pan set, the combination which comprises: a plurality of elongate bake pans each formed from a thin sheet metal blank bent and folded to provide a bottom, an open top, opposed sidewalls, and end walls which include folds of excess metal in the blank; a rim flange on each sidewall and on each end wall defining the open top of the pan, said rim flanges extending outwardly from said side and end walls; a rectangular rigid frame surrounding said pans and readily removable therefrom, said frame having spaced parallel side members and spaced parallel end members, each of said side members having a lower edge, and an upper edge underlying the rim flanges of the pan end walls; means on said frame supporting the rim flanges of the pan sidewalls; cooperative means on the side members of the frame and on the folds of the pan end walls, for releasably latching each pan in a position upon the frame at which the upper edges of the frame side members rest in close proximity to the outwardly extended rim flanges of the pan end walls; and a displaceable harness extending substantially the length of said frame and including clamping means extending substantially the length of the harness for clamping said rim flanges of the pan end walls into firm contact upon the upper edges of the frame side members.

14. The combination as specified by claim 13, wherein is included a displaceable harness including means for clamping said rim flanges of the pan end walls into firm contact upon the upper edges of the frame side members.

15. In a multiple bake pan set, the combination which comprises: a plurality of elongate bake pans each formed from a thin sheet metal blank bent and folded to provide a bottom, an open top, opposed sidewalls, and end walls which include fold of excess metal in the blank; a rim flange on each sidewall and on each end wall defining the open top of the pan, said rim flanges extending outwardly from said side and end walls; a rectangular rigid frame surrounding said pans and having spaced parallel side members and spaced parallel end members, each of said side members having a lower edge, and an upper edge underlying the rim flanges of the pan end walls; means on said frame supporting the rim flanges of the pan sidewalls; cooperative means on the side members of the frame and on the folds of the pan end walls, for releasably latching each pan in a position upon the frame at which the upper edges of the frame side members rest in close proximity to the outwardly extended rim flanges of the pan end walls; a displaceable harness including means for clamping said rim flanges of the pan end walls into firm contact upon the upper edges of the frame side members; said harness comprising a pair of U-shaped slide members each adapted to embrace the side members of the frame; and means for detachably securing said slide members in said embracing position.

16. The combination as specified by claim 15, wherein the aforesaid means on said frame supporting the rim flanges of the pan sidewalls, includes means to space from one another the rim flanges of the sidewalls of adjacent pans in the set.

17. The combination as specified by claim 1, wherein the pans are of seamless construction, formed or molded.

18. The combination as specified by claim 7, wherein the pans are of seamless construction, formed or molded.

19. The combination as specified by claim 1, wherein said plurality of bake pans is of one-piece construction.

20. In a multiple bake pan set, the combination which comprises: a plurality of bake pans each having a bottom, opposed sidewalls, opposed end walls, and an open top; a rim portion on each sidewall and on each end wall defining said open top, said rim portion extending outwardly from said sidewall and end walls; a rigid frame supporting the pans and readily removable therefrom, said frame having spaced parallel side members and spaced parallel end members, each of said side and end members having an upper flange underlying certain rim portion of some of the pans; and a harness extending substantially the length of the frame and mountable upon said frame, said harness including means extending substantially the length of said harness for clamping said certain pan rim portions into firm engagement with the underlying upper flanges of said frame member.

21. The combination as specified by claim 20, wherein said clamping means of the harness comprises a flange overlying said certain pan rim flanges in protective relationship thereto, for shielding said rim portions of the pans from damaging impacts directed thereto.

22. The combination as specified by claim 21, wherein said frame and harness are secured to, carried by and completely circumscribe the outer periphery of the multiple bake pan set.

23. The combination as specified by claim 21, wherein the rim portions of the pans carry depending flanges spaced from the pan walls, and the clamping means of the harness clamps said depending flanges against the rigid frame aforesaid.

24. The combination as specified by claim 23, wherein the clamping means of the harness covers and shields said depending flanges of the pans from damage by impacts directed thereto.